United States Patent [19]

Matsumoto et al.

[11] Patent Number: 4,748,037
[45] Date of Patent: May 31, 1988

[54] PROCESS FOR PRODUCING A BEAN CAKE

[75] Inventors: Yukio Matsumoto; Gyota Taguchi, both of Kanagawa, Japan

[73] Assignee: The Nisshin Oil Mills, Ltd., Tokyo, Japan

[21] Appl. No.: 14,103

[22] Filed: Feb. 3, 1987

Related U.S. Application Data

[63] Continuation of Ser. No. 766,925, Aug. 19, 1985, abandoned.

[30] Foreign Application Priority Data

Aug. 29, 1984 [JP] Japan ................................ 59-178407

[51] Int. Cl.⁴ ............................ A23L 1/18; A23L 1/20
[52] U.S. Cl. .................... 426/448; 426/460; 426/516; 426/634
[58] Field of Search ............... 426/448, 516, 523, 634, 426/460

[56] References Cited

U.S. PATENT DOCUMENTS

| | | | |
|---|---|---|---|
| 3,480,442 | 11/1969 | Atkinson | 426/448 |
| 4,113,822 | 9/1978 | Takiura et al. | 425/204 |
| 4,364,664 | 12/1982 | Theysohn | 425/204 |
| 4,381,184 | 4/1983 | Hurni et al. | 426/448 |
| 4,540,592 | 9/1985 | Myer et al. | 426/516 |

*Primary Examiner*—George Yeung
*Attorney, Agent, or Firm*—Jeffers, Hoffman & Niewyk

[57] ABSTRACT

A process for producing a bean cake which comprises feeding whole or hulled grains of beans to a twin-screw extruder, extruding the beans through the twin-screw extruder at a temperature in the range of 90° to 250° C. to form a cake, and while extruding, adjusting the moisture content of the beans to be treated to the range of 8 to 50 weight percent and swelling the starch component while texturizing the protein component of the beans.

6 Claims, 1 Drawing Sheet

PROCESS FOR PRODUCING A BEAN CAKE

This is a continuation of application Ser. No. 766,925, filed Aug. 19, 1985, now abandoned.

BACKGROUND OF THE INVENTION

1. Field of the Invention

This invention relates to a process for producing a snack-like cake having a superior texture through extremely simplified stages by using the whole or hulled grains of beans or cereals as raw material, as they are, and employing a twin-screw extruder.

2. Description of the Prior Art

Swelled snack cakes having recently been broadly liked among cakes are not only sold as a kind of snack cakes, but also applicable to relishes, health foods, etc. Raw materials therefor are powder of wheat flour, cornstarch, cornflour, rice flour, etc., and the cakes have been produced by subjecting such raw material to sufficient moisture-conditioning, followed by subjecting it to extrusion cooking by way of a single screw extruder as a pressure-heating extruder. Recently, production of breakfast cereals and baby foods by way of a twin-screw extruder has been developed by Werner and Pfleiderer Company in West Germany (Food Enginerring International, May, 1984, pages 42-43). These raw materials comprise modified starch wheat flour and proteins, and any of these are of powder as in the case of single screw extruder.

Any of conventional snack cakes employing an extruder as described above must use powder as raw material; hence in the case of grain-form raw material, a means of once milling is required. Further, since the moisture content of powder is generally legs than 10%, it is necessary for the treatment by extruder to increase the moisture content to the level of 20%; thus a moisture-conditioning process therefor has been indispensable.

SUMMARY OF THE INVENTION

The object of the present invention is to provide a process for producing a snack-like cake having a superior texture through much more simplified stages than those of conventional processes by using the whole or hulled grains of beans or cereals as raw material, as they are, without pulverizing.

The present inventors have made extensive research, and have found that when the whole or hulled grains of beans or cereals are, as they are, subjected to extrusion cooking by means of a twin-screw extruder, if required, while the moisture content thereof is adjusted, then a superior snacklike cake having a snack-like soft texture are obtained.

The present invention resides in this finding.

BRIEF DESCRIPTION OF THE DRAWING

The accompanying drawing shows a perspective view of a twin-screw extruder employed in the present invention.

DETAILED DESCRIPTION OF THE PREFERRED EMBODIMENTS

Figure 1:
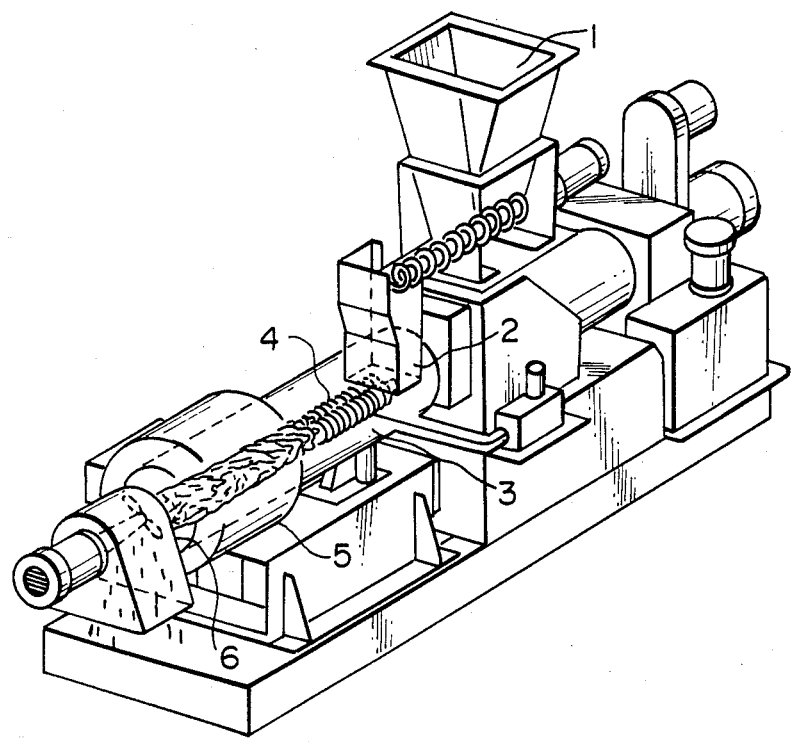

Examples of preferred beans used in the present invention are preferably dried small red bean, kidney bean, pea, cow pea, broad bean, chick pea, lima bean, green bean, etc. These beans contains 5 to 6% by weight or less lipid, 20 to 30% by weight of protein and 50 to 80% by weight of carbohydrate, and are easily subjected to texturing and swelling through extrusion cooking. On the other hand, cereals used have no particular limitation, and thus foxtail millet, oat, barley, Job's tears, rice, buckwheat, corn, barnyard millet, rye, sorghum, etc. are usable.

The raw material is fed through a feeder 1 of a twin-screw extruder equipped with two screws 4 and at that time, if required, water is fed through a feeding part 2 or at another part to adjust the moisture content of the raw material. This water addition is carried out so that the moisture content of the total raw material may amount to 8 to 50% by weight, preferably 10 to 40% by weight, but if the moisture content falls originally in this range, the water addition is unnecessary. An adequate moisture content is necessary for sufficiently melting and texturing starch and protein through pressure-heating treatment, and also swelling them by steam at the ejecting port of a die 6. If the moisture content of the total raw material is less than 8% by weight, starch and protein are not molten and textured, but the grains scorch and solidify in the form of pellets in the treatment. If it is greater than 50% by weight, the grains of the raw material are not pulverized, but remain as they are ; hence they are not sufficiently textured and the swelling extent is extremely inferior.

The temperature of barrel 3 of the twin-screw extruder is set to 90° to 250° C., preferably 110° to 200° C. by means of a heater 5, and the quantity of the raw material fed is adjusted so that the substantial retention time at the heating barrel part may be usually 10 to 90 seconds. If the temperature of barrel 3 is lower than 90° C., then even if the retention time at the heating barrel part is prolonged, the pulverizing, texturing and swelling of the raw material are difficult. If it exceeds 250° C., scorching begins to occur instantaneously and the stationary operability of the extruder also becomes inferior.

When the shape of die 6 of the twin-screw extruder is varied, it is possible to vary the form of the product, after molding, cutting, drying, seasoning, frying, etc. are carried out. In addition, the seasoning materials may be added to the exterior together with beans or cereals or in the form of a dispersion thereof in the water to be added.

Extruders include double-screw extruder and single screw extruder, but the latter is inferior in its conveying property, particularly in the case of raw materials where grain-form raw materials and their sizes are uneven, and stationary conveying is impossible. Whereas, the former has an extremely superior conveying property and it is possible to treat the whole or hulled grains of beans or cereals as they are.

EXAMPLE 1

The whole grains of dried pea (moisture content 13.4% by weight, protein 21.7% by weight and lipid 2.3% by weight) (20 Kg) were as they were, fed to the feeding port of a twin-screw extruder (BC-45 type manufactured by Creusot-Loir Company in France), and at the same time, water was separately fed to the feeding port by means of a metering pump so that the moisture content of the total raw material might amount to 30% by weight. Setting the barrel temperature to 180° C., extrusion cooking was carried out. The shape of the die was circular ; the number of hole, 1, ; the hole diameter, 3 mm ; and the number of revolutions of the screws, 200 rpm. The substantial retention time at the heating part was adjusted to about 60 seconds. The treated material continuously extruded from the die was cut to a length of about 1 cm by means of propeller cutter, followed by spraying a 10% aqueous solution of NaCl, and drying by ventilation at 70° C. for 3 hours to obtain a spherical snack-like cake somewhat larger than the raw material pea (13.8 Kg). In this snack-like cake, the flavor of pea remained sufficiently, and this cake had a crisp, soft texture and was very delicious.

EXAMPLE 2

The whole grains of dried small red bean (moisture content 15.4% by weight, protein 20.5% by weight and lipid 2.6% by weight) (50 Kg) were, as they were, fed to the feeding port of a twin-screw extruder, and at the same time, a 30% aqueous solution of sugar was fed through the injecting port on the feeding port side of the barrel by means of a metering pump so that the moisture content of the total raw material might amount to 40% by weight. Setting the barrel temperature to 105° C., extrusion cooking was carried out. The shape of the die was circular; the number of holes, 5; the hole diameter, 1.5 mm; and the number of revolutions of the screws, 300 rpm. The rate of the raw material fed was adjusted so that the substantial retention time at the heating part might be about 15 seconds. The treated material continuously extruded from the slit of the die was cut to a length of about 0.5 cm by means of a propeller cutter, followed by drying by ventilation at 80° C. for 2 hours to obtain a snack-like cake having an appearance of sugared small red bean (57 Kg). In this snack-like cake, the flavor specific of small red bean remained, and the cake had a crisp, soft texture and was very delicious.

EXAMPLE 3

The whole grains of hulled rice (moisture content 15.3% by weight, protein 7.6% by weight and lipid 3.1% by weight) (30 Kg) were, as they were, fed to the feeding port of a twin-screw extruder, and at the same time, water was fed through the injecting port on the feeding port side of the barrel by means of a metering pump so that the moisture content of the total raw material might amount to 20% by weight. Setting the barrel temperature to 200° C., extrusion cooking was carried out. The slit of the die had a distance of 4 mm and a width of 5 cm and the number of revolutions of the screws was 180 rpm. The rate of the raw material fed was adjusted so that the substantial retention time at the heating part might be about 20 seconds. The treated material continuously extruded from the slit of the die was loaded on a belt conveyor, followed by cutting to a length of about 10 cm, spraying a soybean sauce containing 0.5% by weight of cayenne-pepper and 30% by weight of sugar and drying by ventilation at 60° C. for 3 hours to obtain a snack-like cake in the from of the flat bread (34.2 Kg). This snack-like cake had a crisp, soft texture and easy very delicious.

The snack-like cake obtained according to the process of the present invenition uses as raw material the whole or hulled grains of beans and cereals as they are, and nevertheless, their milling-mixing, texturing and swelling are sufficiently carried out; its texture is very soft; its flavor, shape and color can be optionally controlled; and yet it is possible to continuously produce the cake at low cost. Thus, according to the present invention, the milling step of raw material is unnecessary and even when the moisture content is about 10% by weight, it can be produced; hence it is possible to reduce the necessity of adjusting the moisture content to a large extent.

What is claimed is:

1. A process for producing a bean cake which comprises feeding whole or hulled grains of beans containing, in dry base, less than 6 weight percent lipid, 20 to 30 weight percent protein and 50 to 60 weight percent carbohydrate comprising at starch component to a twin-screw extruder, extruding the beans through the twin-screw extruder at a temperature in the range of 90° to 250° C. to form a cake, and while extruding, adjusting the moisture content of the beans to be treated to the range of 8 to 50 weight percent and swelling the starch component while texturizing the protein component.

2. A process according to claim 1 wherein said beans are selected from the group consisting of small red bean, kidney bean, pea, cow pea, broad bean, chick pea, lima bean and green bean.

3. A process according to claim 1 wherein said beans are dried pea.

4. A process according to claim 1 wherein said beans are dried small red bean.

5. A process according to claim 1 wherein said adjusting is carried out so as to give a moisture content of the beans of 10 to 40% by weight.

6. A process according to claim 1 wherein said extruding step is carried out by setting the barrel temperature of said two-screw extruder to 110° to 200° C. and for a retention time of the beans at the heating barrel part of the extruder, of 10 to 90 seconds.

* * * * *

UNITED STATES PATENT AND TRADEMARK OFFICE
CERTIFICATE OF CORRECTION

PATENT NO. : 4,748,037
DATED : May 31, 1988
INVENTOR(S) : Yukio Matsumoto et al

It is certified that error appears in the above-identified patent and that said Letters Patent is hereby corrected as shown below:

Col. 1, line 35, change "legs" to --less--;
Col. 2, line 1, change "80" to --60--;
Col. 2, line 43, change "exterior" to --extruder--;
Col. 4, line 8, change "easy" to --was--;
Claim 6, Col. 4, line 47, change "two" to --twin--.

Signed and Sealed this

First Day of November, 1988

Attest:

DONALD J. QUIGG

Attesting Officer

Commissioner of Patents and Trademarks